Figure 1:
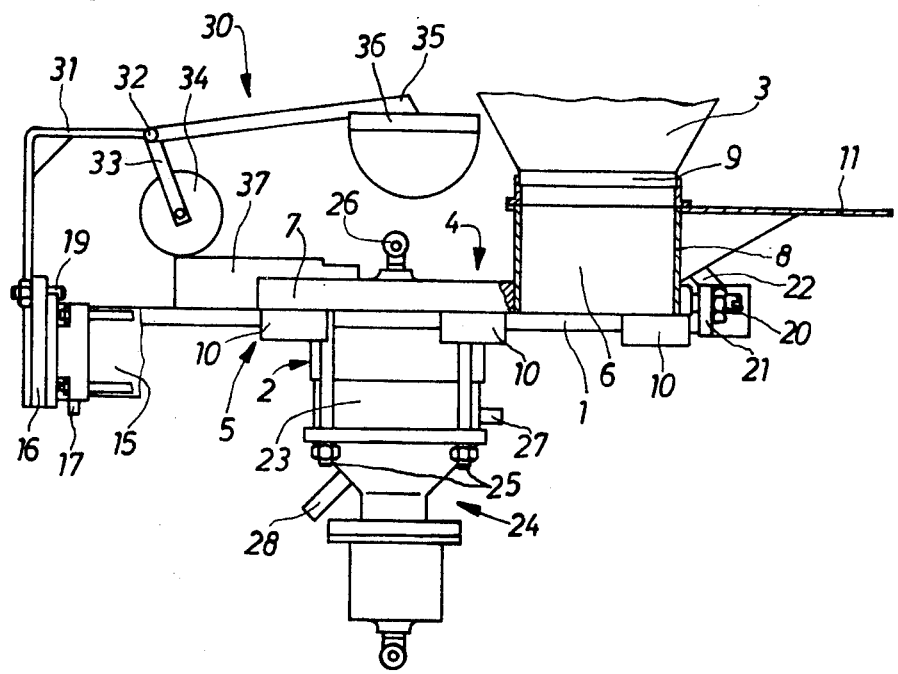

United States Patent [19]

Bieri

[11] 4,036,121
[45] July 19, 1977

[54] BREWING APPARATUS FOR BEVERAGE-BREWING MACHINE

[75] Inventor: Karl Bieri, Zurich, Switzerland

[73] Assignee: Hagezet-Aktiengesellschaft, Zurich, Switzerland

[21] Appl. No.: 618,333

[22] Filed: Oct. 1, 1975

[30] Foreign Application Priority Data

Oct. 2, 1974 Switzerland ............. 13270/74

[51] Int. Cl.² ............................................. A47J 31/00
[52] U.S. Cl. ..................................... 99/289 R; 99/295
[58] Field of Search ............... 99/289, 286, 323, 9, 99/295; 222/361

[56] References Cited

U.S. PATENT DOCUMENTS

| 1,880,753 | 10/1932 | Brand ............................ 222/361 |
| 2,332,938 | 10/1943 | Schmidberger ................ 222/361 |
| 2,910,928 | 11/1959 | Rota ............................... 99/286 X |
| 3,084,047 | 4/1963 | Holstein et al. ............... 99/289 X |
| 3,089,404 | 5/1963 | Parraga ......................... 99/289 |
| 3,120,440 | 2/1964 | Ross .............................. 99/289 X |
| 3,280,720 | 10/1966 | Kuhn ............................. 99/323.9 |
| 3,812,273 | 5/1974 | Schmidt ........................ 99/295 X |

Primary Examiner—Harvey C. Hornsby
Assistant Examiner—Arthur O. Henderson
Attorney, Agent, or Firm—Darby & Darby

[57] ABSTRACT

An apparatus for brewing beverages from a ground or powdered substance comprises a movable intermediate member for conveying the substance to a stationary brewing chamber while simultaneously ensuring proper sealing of the chamber and measurement of the substance.

5 Claims, 3 Drawing Figures

BREWING APPARATUS FOR BEVERAGE-BREWING MACHINE

This invention relates to a brewing apparatus for a machine for brewing beverages from a ground or powdered substance, the apparatus comprising a stationary base plate, a stationary brewing chamber integral with the base plate, and a source from which the ground or powdered substance is withdrawn.

Automatically-operating machines for brewing beverages, especially coffee, are already known. Some of them, such as the one taught by French Pat. No. 2,119,113, comprise a brewing apparatus in which the brewing chamber is secured to a vertical support rod. With the aid of this rod, the brewing chamber is moved in a straight line from its filling position to the brewing position and back again. Such machines are, however, relatively complicated.

In other machines of this kind, e.g., as described in German published application No. 1,295,143, a brewing container is pushed out from the side of the brewing chamber to be filled with ground coffee. After the brewing operation, it is turned over and subjected to the action of a rinsing apparatus. A decisive drawback of such machines is that the problem of sealing, which is critical in any case, presents itself not only at the top of the brewing container but also at the bottom.

It is an object of this invention to provide a brewing apparatus of the kind initially mentioned which is much simpler in construction, has more favorable sealing conditions, and also makes it possible to dispense with additional auxiliary means for measuring out the substance from which the beverage is to be brewed.

To this end, the brewing apparatus according to the present invention further comprises an intermediate member displaceable along a path of movement with respect to the base plate, a brewing head, and a transport container for conveying the ground or powdered substance, the brewing head and the transport container being borne by the intermediate member, and the withdrawal source and the brewing chamber being aligned with and spaced from one another in the path of movement of the intermediate member.

Figure 2:
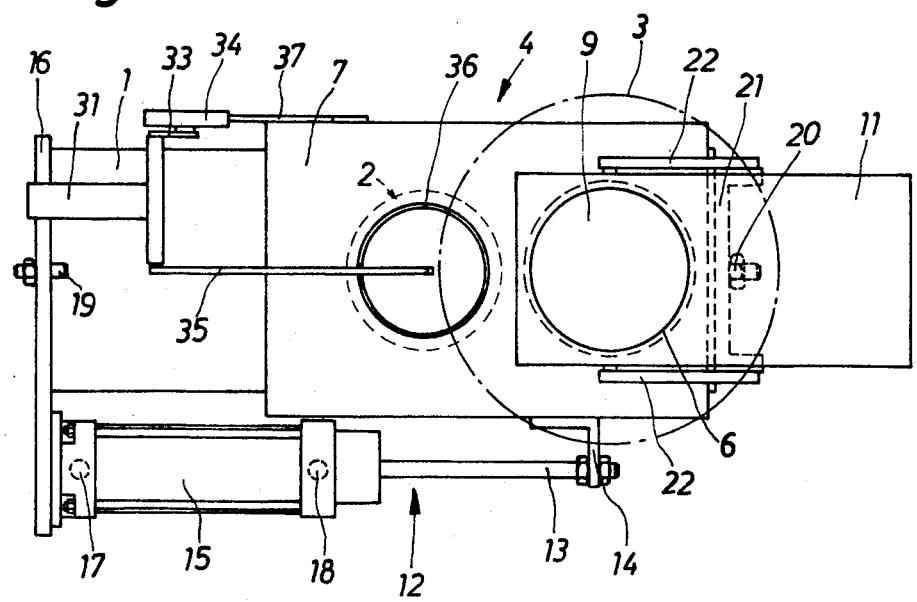
Figure 3:
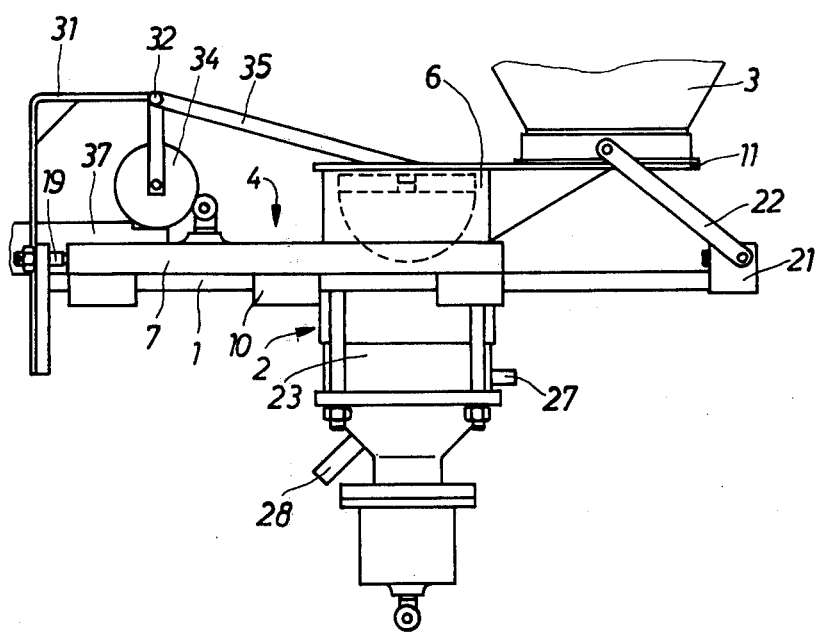

A preferred embodiment of the invention will now be described in detail with reference to the accompanying drawings, in which:

FIG. 1 is an elevation, partially in section, of the brewing apparatus in brewing position, FIG. 2 is a top view of the brewing apparatus of FIG. 1 in brewing position, and FIG. 3 is an elevation of the brewing apparatus of FIG. 1 in filling position.

The brewing apparatus illustrated comprises a stationary base plate 1 which is integral with a brewing chamber 2. The brewing chamber 2 is disposed below the base plate 1, which has an aperture situated above the chamber 2. The apparatus further comprises a source 3 from which the ground or powdered substance is withdrawn which is to serve for brewing the beverage. This substance may, for example, be ground coffee or tea leaves. In the present embodiment, the source of the substance is a hopper 3. However, it might also be the outlet of a coffee-grinder or the like.

Between the brewing chamber 2 and the hopper 3 is a movable intermediate member 4 bearing a brewing head 5 and a transport container 6 for conveying the ground or powdered substance. The parts 4, 5, and 6 are rigidly connected so as to form a single unit. The brewing head 5 comprises a cover-plate 7 which is designed to seal off the top opening of the brewing chamber 2 and is slidingly mounted on the base plate 1. The transport container 6 has a jacket 8 which is integral with the cover-plate 7 of the head 5. Since the jacket 8 rests on the base plate 1, the latter closes off the transport container 6 at the bottom. The container 6 remains open at the top so as to communicate with the hopper 3, which is stationary and may, for example, be funnel-shaped. The hopper 3 has an outlet opening 9, the inside diameter of which is equal to or less than the inside diameter of the jacket 8 of the transport container 6.

The movable intermediate member 4 may be designed to move in either a straight or a non-straight line. The drawing illustrates an intermediate member 4 designed to reciprocate in a straight line. For this purpose, it comprises brackets 10 affixed on both sides to the cover-plate 7 and to the jacket 8. Thus the brewing head 5 functions as a sort of carriage. The brackets 10 extend under the base plate 1 so as to guide the intermediate member 4 along the base plate 1. The brackets 10 may be made of copper or some other bearing metal. In order to have as little friction as possible between the intermediate member 4 and the base plate 1, tracks made of an anti-friction material, e.g., plastic tracks (not shown), may be inserted along the edges of the base plate 1.

The hopper 3 is aligned with and spaced from the brewing chamber 2 in the path movement of the movable intermediate member 4. The spacing of these two parts of the brewing apparatus, having regard to the movable intermediate member 4, is such that the cover-plate 7 seals off the top opening of the brewing chamber 2 when the transport container 6 is situated beneath the hopper 3.

In the other end position of the movable intermediate member 4, the transport container 6 is situated above the top opening of the brewing chamber 2, the cover plate 7 then being situated to one side of the brewing chamber 2 (FIG. 3). Consequently, in the one end position, i.e., the brewing position, the transport container 6 is coaxial with the hopper 3, while in the other end position, it is above and coaxial with the brewing chamber 2.

The grounds or other matter remaining in the brewing chamber 2 after the brewing operation may be rinsed out automatically in a known manner which does not form part of this invention.

In order to keep the ground or powdered substance from continuing to flow out of the hopper 3 when the transport container 6 is not positioned directly below it, a closure-plate 11 is secured to the side of the jacket 8 remote from the cover plate 7. The closure-plate 11 closes off the oulet opening 9 when the intermediate member 4 moves from one end position into the other.

The intermediate member 4 is caused to move by a reciprocating mechanism 12 (FIG. 2) situated to one side of the base plate 1. The mechanism 12 may be a hydraulic cylinder, a piston-rod 13 of which is connected to the intermediate member 4 by a connecting angle 14. A housing 15 of the hydraulic cylinder is secured to the base plate 1 by means of a support plate 16 and supplied with hydraulic fluid through pipes 17 and 18.

The length of the path of movement of the intermediate member 4 is adjustably limited by stops 19 and 20, stop 19 being secured to the support plate 16 and stop 20 to a supporting bracket 21 situated as the other end of the base plate 1. Also attached to the supporting bracket 21 are swivel arms 22 which keep the hopper 3 stable. They may also be used to adjust the height or position of the hopper 3 with respect to the jacket 8 and the closure-plate 11, e.g., if a transport container 6 of a different size is used.

The brewing chamber 2 comprises a body 23 and an adjoining lower portion 24 which are connected to each other and also secured to the base plate 1 by securing means 25. The cover-plate 7 has an inlet pipe 26 for the water used in brewing and rinsing. The body 23 is provided with an outlet pipe 27 for the brewed beverage, while the lower portion 24 has a drain pipe 28 for the rinse water.

The brewing apparatus described above operates as follows, it being assumed that the beverage to be brewed is coffee: The position of the movable intermediate member 4 as shown in FIGS. 1 and 2 may be regarded as its starting position. In this position, the transport container 6 fills up with ground coffee from the hopper 3. At this time, the brewing chamber 2 is sealed off by the cover-plate 7 of the brewing head 5 and is ready for brewing the coffee. When the brewing operation is started up, e.g., by the pushing of a button (not shown), the driving fluid flows through the pipe 18 into the reciprocating mechanism 12, so that the piston-rod 13 moves in a first direction. The movable intermediate chamber 4 moves with the piston-rod 13 until the transport container 6 comes to be positioned directly above the brewing chamber 2.

Since the brewing chamber 2 is stationary, and only the brewing head 5 together with the cover-plate 7 and the transport container 6 move at right angles to the geometrical axis of the brewing chamber 2, the necessity for sealing arises solely at the upper edge of the brewing chamber 2, in contrast to machines in which the brewing chamber is moved out so that a corresponding sealing arrangement must be provided at its lower edge as well.

When the container 6 is positioned over the brewing chamber 2, the latter fills up with ground coffee from the container 6. Since the volume of the chamber 2 is less thant that of the container 6, the chamber 2 is certain to be completely filled with ground coffee. Because the transport container 6 is conveyed to the mouth of the chamber 2 and then returned to the starting position shown in the drawing, its edge acts in the manner of a levelling-blade as it passes over the mouth of the chamber 2 on the return movement. Thus the amount of ground coffee contained in the chamber 2 is always the same, without there being any necessity for the provision of special measuring devices.

The supply of fluid through the pipe 18 is then cut off, and this fluid is fed to the hydraulic cylinder 12 through the pipe 17 instead. As a result, the intermediate member 4 is moved back into its starting position. The amount of ground coffee removed from the transport container 6 is replaced from the hopper 3, and the cover-plate 7 seals off the mouth of the brewing chamber 2.

Hot water begins to be supplied to the chamber 2 through the inlet pipe 26 and penetrates through the ground coffee, and the brew leaves the chamber 2 through the outlet pipe 27. After a quantity of hot water adapted to the amount of ground coffee has been supplied to the brewing chamber 2, the brewed coffee ceases to flow, and the phase of rinsing the chamber 2 commences. The coffee grounds then flow out through the drain pipe 28 together with the rinse water. As already stated above, these operations may take place in a manner known per se which does not form part of the present invention. When the chamber 2 has been rinsed, the brewing apparatus, and hence the entire machine, is ready for a fresh brewing operation.

The slidable arrangement of the cover-plate 7 together with the transport container 6 with respect to the stationary brewing chamber 2 makes possible an extremely simple construction and, above all, obviates the necessity of providing a special sealing arrangement at the lower edge of the chamber 2 and special measuring devices.

In some cases it may be desirable to compress the ground coffee slightly before allowing the hot water to flow through it. For this purpose, the brewing apparatus is equipped with a pressing device 30. It comprises an angle bracket 31, the upright of which is secured to the support plate 16, while a shaft 32 is mounted at its other end. One end of the shaft 32 bears a feeler arm 33 provided with a feeler roller 34, and the other end bears a bent support lever 35 for a pressing mold 36. Integral with the brewing head 5 is a slide 37 which the feeler roller 34 can roll. While the movable intermediate member 4 is moving to the left, as viewed in the drawing, the roller 34 rolls along the top of the slide 37. As soon as the member 4 has moved far enough, the roller 34 drops down a step in the top of the slide 37, thus causing the pressing mold 36 to be lowered into the transport container 6. Owing either to the weight of the mold 36 or, for example, to spring tension, the ground coffee which has run into the brewing chamber 2 is compressed. When the intermediate member 4 starts to move back again, the feeler roller 34 is lifted off the step of the slide 37, so that the pressing mold 36 leaves the transport container 6 and the member 4 is free to regain its starting position.

What is claimed is:

1. Apparatus employing a brewing liquid for brewing beverages from a grund or powdered material insoluble in the brewing liquid comprising:

A base plate, means integral with said base plate defining a stationary beverage brewing chamber having an inlet opening, a container for storing the material to be brewed, said container having an outlet, an intermediate member which is movable with respect to the base plate between a first and second position along the predefined path, a brewing head and a transport container carried by said intermediate member and spaced apart along the path of movement of the intermediate member, said brewing head including means cooperating with said brewing chamber for pressure sealing the inlet opening thereof when said intermediate member is in said first position, said transport container having an inlet and an outlet and being constructed and arranged so that said transport container inlet is aligned with said storing container outlet when said intermediate member is in said first position and so that said transport container outlet is aligned with said brewing chamber inlet when said intermediate member is in said second position, and means for moving said intermediate member from said first position wherein said transport container receives material from said storing container to said second position wherein the transport container outlet dispenses material into said brewing chamber and the brewing head is out of operative relationship with said brewing chamber.

2. Apparatus as in claim 1 wherein said brewing head includes carriage means for moving the intermediate member with respect to said base plate.

3. Apparatus as in claim 1 further comprising means carried by said intermediate member for sealing the outlet of the storing container wherein said intermediate member is in said second position.

4. Apparatus as in claim 3 wherein said sealing means comprises a closure plate attached to and carried by said transport container.

5. Apparatus as in claim 1 further including a compressing device for material in said transport container comprising:

slide means mounted on said intermediate member;

pressing means adapted to fit into said transport container inlet for applying pressure to material therein, feeler means including a portion secured to said pressing means for supporting the same and a portion retained in contact with said slide means for following the same as said intermediate member is moved, said feeler means being constructed and arranged so that said pressing means is inserted into said transport container inlet when said intermediate member is in said second position and so that said pressing means is withdrawn from said transport container when said intermediate member is in said first position; and means mounting said feeler means for movement with respect to said slide means and said base plate.

* * * * *